US000001382H

United States Statutory Invention Registration [19]

[11] Reg. Number: H1382

Goldberg et al.

[43] Published: Dec. 6, 1994

[54] BEACH CHAIR

[76] Inventors: Norma Goldberg, 3000 Ocean Pkwy., Brooklyn, N.Y. 11235; Roseanne DeMonte, 2731 Bath Ave., Brooklyn, N.Y. 11214

[21] Appl. No.: 555,366

[22] Filed: Jul. 19, 1990

Related U.S. Application Data

[63] Continuation of Ser. No. 520,966, May 10, 1990, abandoned, which is a continuation of Ser. No. 379,226, Jul. 13, 1989, abandoned.

[51] Int. Cl.[5] ..... A47C 7/62

[52] U.S. Cl. ..... 297/188.14; 108/25

[56] References Cited

U.S. PATENT DOCUMENTS

| | | | |
|---|---|---|---|
| 879,489 | 2/1908 | Pokorny | 297/194 X |
| 3,233,940 | 2/1966 | Tooley, Jr. | 108/25 X |
| 3,947,903 | 4/1976 | Monke | 297/188 X |
| 4,003,598 | 1/1977 | Glaze | 297/194 |
| 4,191,420 | 3/1980 | Fassett et al. | 297/194 |
| 4,354,601 | 10/1982 | Harrison | 108/25 X |
| 4,553,785 | 11/1985 | Duke, Jr. et al. | 297/188 X |
| 4,818,017 | 4/1989 | Dykstra et al. | 297/145 X |

FOREIGN PATENT DOCUMENTS

| | | | |
|---|---|---|---|
| 1489048 | 7/1967 | France | 297/423 |
| 443145 | 2/1936 | United Kingdom | 297/194 |

*Primary Examiner*—J. Woodrow Eldred
*Attorney, Agent, or Firm*—Terry M. Gernstein

[57] ABSTRACT

A beach chair includes a compartment section that enables a beachgoer to carry a plurality of different items, such as keys, lotion bottles, loose change and the like, in the chair.

1 Claim, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FIG. 2
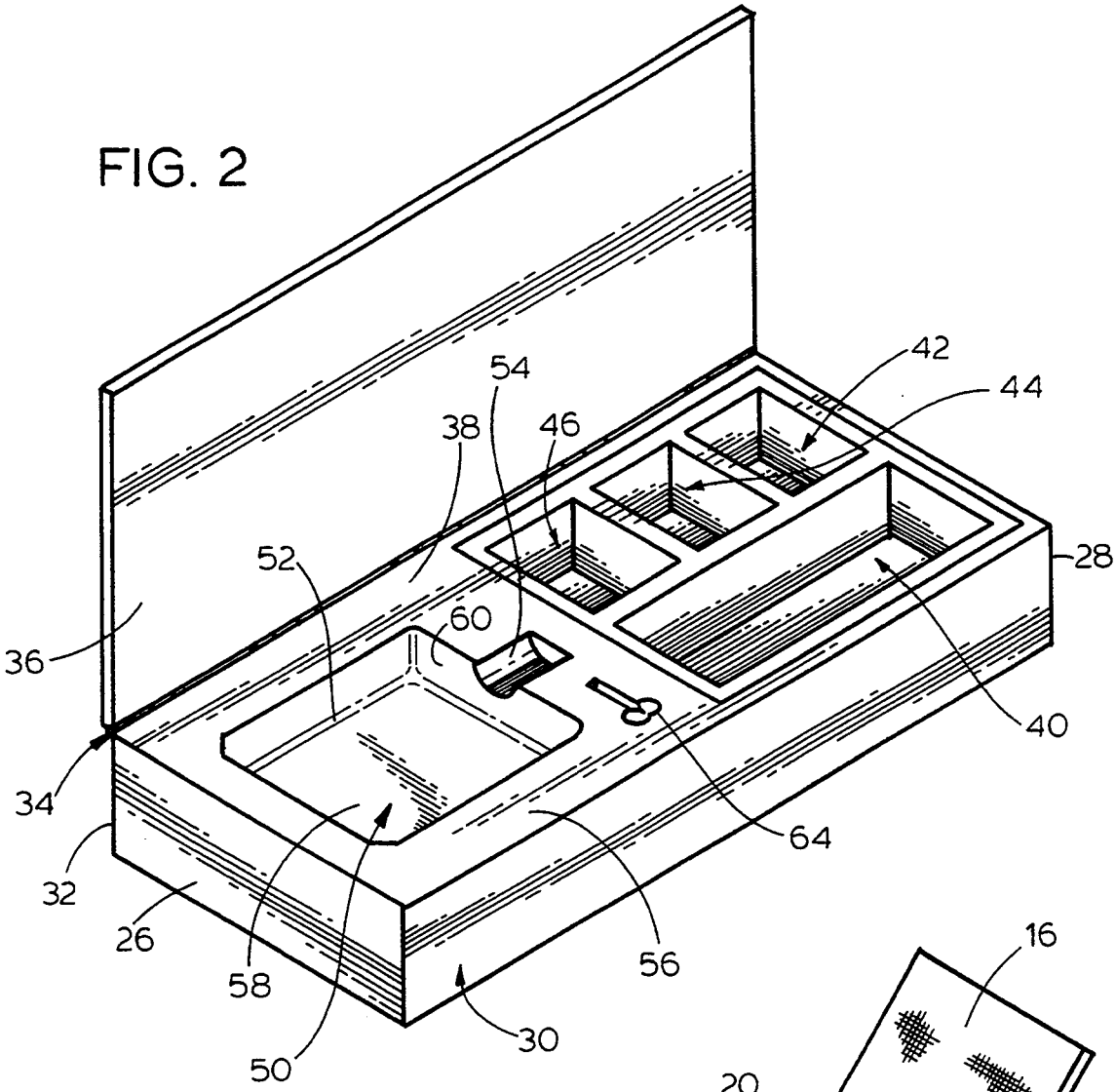
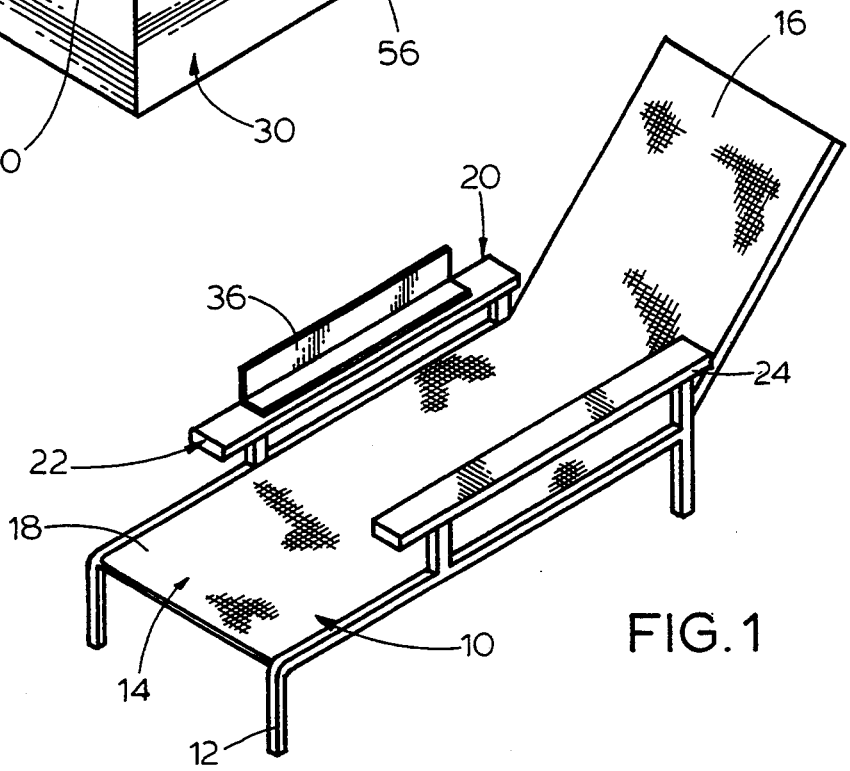
FIG. 1

BEACH CHAIR

This is a continuation of copending application Ser. No. 07/520,966, filed on May 10, 1990, now abandoned, which was a continuation of application Ser. No. 07/379,226, filed on Jul. 13, 1989, and is abandoned.

TECHNICAL FIELD OF THE INVENTION

The present invention relates to the general art of supports, and to the particular field of chairs.

BACKGROUND OF THE INVENTION

The typical beachgoer has many items that must be carried, and this causes problems for many such people. The beachgoer may have a chair, a towel, an umbrella, plus a myriad of other small items, such as suntan lotion bottles, keys, cigarettes, radios, sunglasses, money and the like.

This beachgoer must juggle all of these items while searching out a desired location. Such a juggling act can be quite onerous.

While there are storage items, such as beach bags and the like that can be used to store many small items, such bags often do not store these items in a secure manner that prevents them from becoming jumbled during transport. For example, a beachbag can cause several items to jumble together, and can even cause bottles to open thereby spilling oil or lotion all over other items in the bag. Still further, if the items become sufficiently jumbled, keys for example, may become caught in a towel, and when the towel is taken out of the bag, the keys can accidentally be pulled out of the bag and lost. This same problem applies to other small items, such as money, cigarette lighters and the like.

Still further, looking through such a jumbled bag can be quite burdensome and thus the full commercial acceptance of such item carriers has been inhibited.

Accordingly, there is a need for a storage device that can securely store various items associated with beachgoing, and which can store such items in a secure and organized manner.

Still further, there is a need for such a container that can be easily carried in addition to other beach items, such as a chair.

OBJECTS OF THE INVENTION

It is a main object of the present invention to provide a storage device that can securely store various items associated with beachgoing, and which can store such items in a secure and organized manner.

It is another object of the present invention to provide a storage device that can securely store various items associated with beachgoing, and which can store such items in a secure and organized manner which can also be easily carried in addition to other beach items, such as a chair.

SUMMARY OF THE INVENTION

These, and other, objects are achieved by a beach chair that includes a storage compartment unit in one arm thereof. The storage compartment includes at least one molded impression that securely holds lotion bottles and a molded impression that securely holds a key. Other sections are also included in the arm compartment.

In this manner, an important item such as a key or a suntan lotion bottle will be securely held in position for easy access. The beachgoer is therefore not required to rummage through a great deal of other items to find these specific items. Furthermore, by being held in a specific molded impression, there is little danger of the lotion bottle breaking or opening or of the key becoming tangled in a beach towel or the like and being lost when that towel is taken out for use.

Still further, by having all of these items stored in the chair, carrying such items in addition to the chair is much easier than carrying a beach bag in addition to a chair.

BRIEF DESCRIPTION OF THE DRAWING FIGURES

FIG. 1 is a perspective view of a beach chair embodying the present invention.

FIG. 2 is a perspective view of a compartment unit of the beach chair.

DETAILED DESCRIPTION OF THE PREFERRED EMBODIMENT OF THE INVENTION

Shown in FIG. 1 is a beach chair 10 of the present invention. The chair 10 is in the form of a lounge-type chair, but could be in other forms as will occur to those skilled in the art based on the teaching of the present disclosure, and includes a plurality of legs, such as leg 12, that support a body section 14 having a head portion 16 and a leg portion 18. The chair is also collapsible.

The chair 10 is used in the normal manner on a beach, but also includes a storage means for storing items such as suntan lotion, keys, cigarettes, loose change and the like so that the chair 10 serves a dual purpose of being a chair as well as being a storage device.

The storage means included in the chair 10 includes a storage compartment 20 in one of the arm supporting units 22. Each of the arm supporting units 22 and 24 can include a compartment, but for the sake of clarity, only the arm unit 22 is shown as including a storage compartment.

The storage compartment 20 is best shown in FIG. 2, and is seen to include a front endwall 26, a rear end wall 28, an inner sidewall 30 and an outer sidewall 32 which co-operate to form an open-topped compartment. A hinge 34 connects a top 36 to the sidewall 32 to cover and uncover the compartment.

A filler means 38 is contained in the compartment, and is formed of plastics type material that is slightly deformable for a purpose that will be understood from the ensuing discussion. The filler material has a plurality of sections defined therein, such as section 40 that is rectangular in cross section and is used to store items such as sunglasses and the like, and sections 42–46 that are square in cross section and can be used to store other small items, such as loose change, cigarette lighters and the like.

The filler material also has a molded impression 50 that is in the form of a bottle having a body section 52 and a top section 54 and has a depth as measured from top surface 56 of the material to a bottom surface 58 of the impression that is sufficient to accommodate a bottle of suntan lotion. A shoulder section 60 is also included. The bottle-shaped molded impression 50 is sized to accommodate most of the major suntan lotion bottles on the market, but since the material is slightly flexible, a larger bottle can be forced into the impression. The material forming the impression will snugly engage the bottle and hold it securely in place. The cap of the bottle will also be held in place so there is little chance of accidental spilling of the contents of the bottle.

The unit also includes a molded impression 64 that is sized and shaped to accommodate a key. The key can be a car key, a hotel room key or the like, and the impression 64 is sized to snugly hold the key in place in the compartment. In this manner, the key is not likely to become entangled with another item and lost when that other item is taken out for use.

It is understood that while certain forms of the present invention have been illustrated and described herein, it is not to be limited to the specific forms or arrangements of parts described and shown.

We claim:

1. A beach chair assembly comprising:

A) a lounge chair unit having a body for supporting a user when that user is in a prone position and a plurality of legs supporting the lounge chair on the ground;

B) two arm units on said lounge chair unit body, with one of said arm units including (1) a compartment unit, (2) a lid hingeably mounted on said one arm unit to cover and uncover said one arm unit compartment unit body, (3) said compartment unit including (a) a compartment body formed of flexible plastic material, (b) ends and sides, with a length dimension being measured between said ends and a width dimension being measured between said sides, (c) a plurality of rectangular compartments defined in said compartment unit body for holding various items, said compartments each including ends and sides, with a length dimension measured between said rectangular compartment ends and which extends along said compartment unit length dimension, said rectangular compartments being located adjacent to one of said compartment unit ends with one of said rectangular compartments being larger than all of the other rectangular compartments and located adjacent to one side of said compartment unit and having a length dimension that is longer than a combined length of all of the other rectangular compartments and a width dimension that is essentially equal to the width dimension of each of the other rectangular compartments, said other rectangular compartments being located adjacent to another side of said compartment unit, (d) a first molded impression defined in said compartment unit flexible body, said first molded impression being located adjacent to another of said compartment unit ends and being in the shape of a bottle, (e) a second molded impression defined in said compartment unit flexible body between said first molded impression and said plurality of rectangular compartments, said second molded impression being in the shape of a key, and (f) said compartment body being flexible to snugly engage a bottle and a key located in said first and second molded impressions respectively.

* * * * *